No. 738,667. PATENTED SEPT. 8, 1903.
C. V. DYER & W. S. WILLETTE.
INSECT DESTROYING MACHINE.
APPLICATION FILED DEC. 1, 1902.
NO MODEL. 2 SHEETS—SHEET 2.
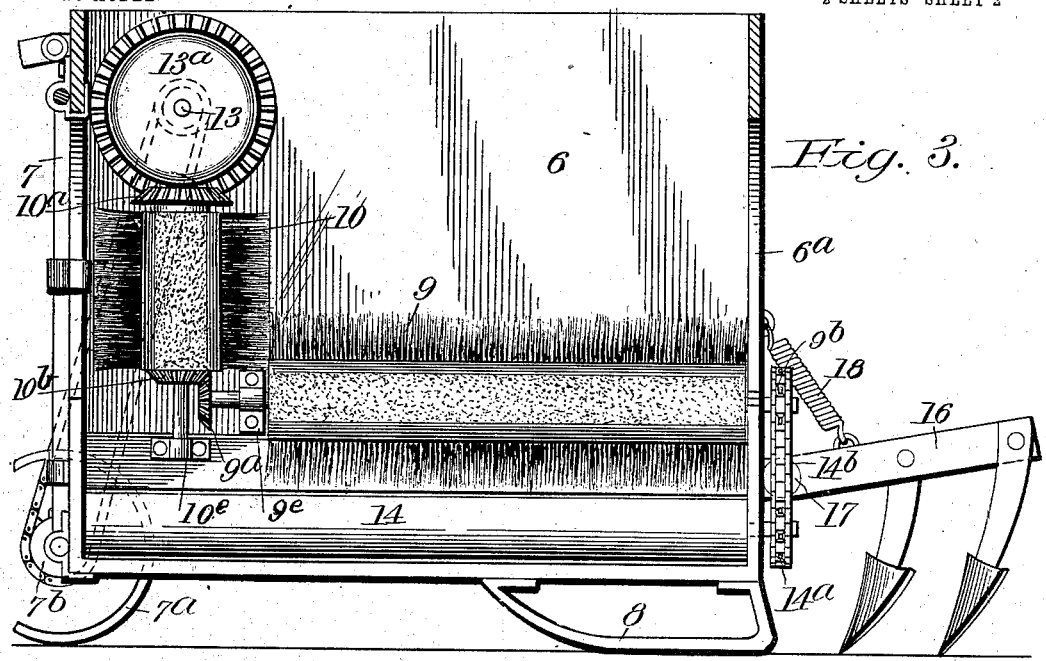
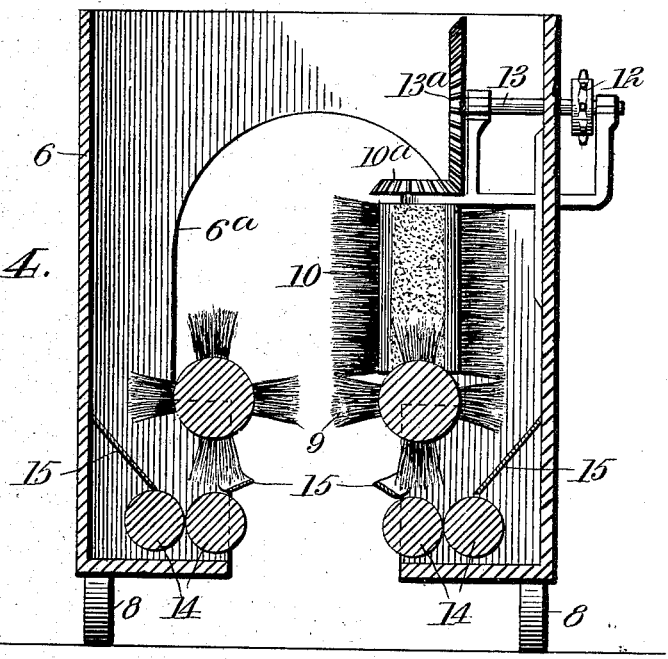

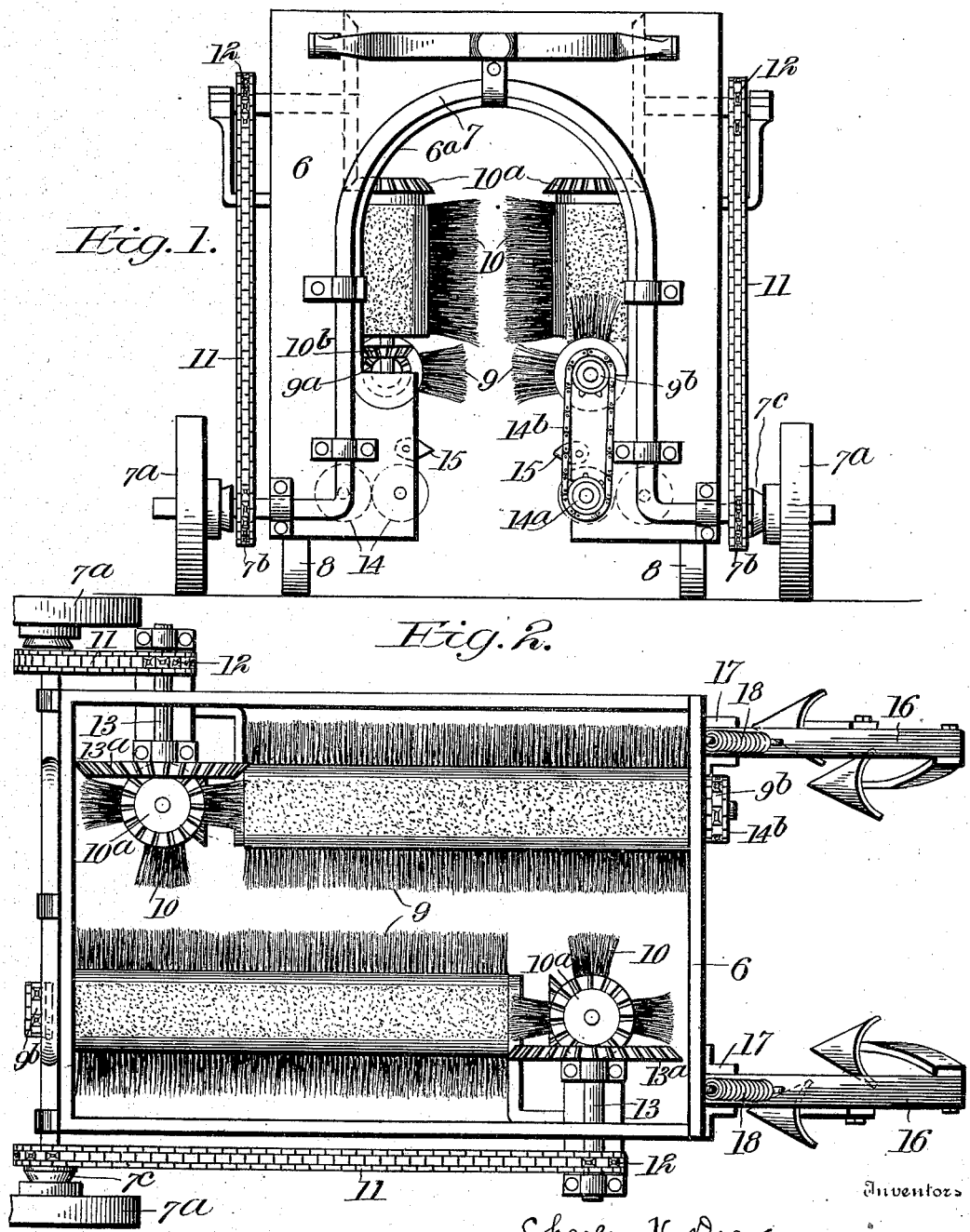

No. 738,667. Patented September 8, 1903.

UNITED STATES PATENT OFFICE.

CHARLES V. DYER AND WILLIE S. WILLETTE, OF CONROE, TEXAS.

INSECT-DESTROYING MACHINE.

SPECIFICATION forming part of Letters Patent No. 738,667, dated September 8, 1903.

Application filed December 1, 1902. Serial No. 133,521. (No model.)

*To all whom it may concern:*

Be it known that we, CHARLES V. DYER and WILLIE S. WILLETTE, citizens of the United States, residing at Conroe, in the county of Montgomery and State of Texas, have invented certain new and useful Improvements in Insect-Destroying Machines; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to insect-destroying machines particularly suitable for collecting and killing the boll-weevil from cotton-plants, and has for its object the construction of an improved and complete machine for the said purpose, together with the addition of cultivator-gangs carried by the machine, as it is desirable to cultivate the plants at the same time as the insect-catching operation is performed.

Speaking generally, the machine comprises a casing divided to straddle and pass over a row of plants, provided with horizontal and vertical rotary brushes on each side and crushing-rolls below the brushes to kill the insects dislodged thereby.

In the accompanying drawings, Figure 1 is a front elevation of the machine. Fig. 2 is a plan view thereof. Fig. 3 is a central longitudinal section, and Fig. 4 is a cross-section.

Referring specifically to the drawings, 6 indicates a rectangular box-like casing, the front, rear, and bottom walls of which are divided, as at $6^a$, to form a passage-way for the plants through the casing between the brushes. At the front end of the casing is an arched axle 7, provided with supporting and driving wheels $7^a$ and driving-pulleys $7^b$, which are preferably provided with a clutch device, as indicated at $7^c$, so that they may be thrown in and out of gear with the driving-wheels. The rear end of the casing slides on runners 8. The brushes comprise a horizontal and a vertical brush on each side of the passage through the casing. The horizontal brushes are indicated at 9 and the vertical brushes at 10, supported to rotate in brackets $9^e$ and $10^e$, respectively. The horizontal and vertical brushes on each side are at opposite ends of the casing, respectively, so that the vertical brush on one side is opposite the horizontal brush on the other side, as shown, and the plant is acted on by a horizontal brush and a vertical brush at the same time accordingly.

The brushes are driven by suitable gearing comprising belts 11 on the pulleys $7^b$ and 12, which latter are on counter-shafts 13, having gears $13^a$ in mesh with pinions $10^a$ on the upper ends of the shafts of the vertical brushes, and the horizontal brushes are driven by bevel-gears $9^a$ on the shafts thereof in mesh with bevel-gears $10^b$ on the lower ends of the shafts of the vertical brushes.

Between the brushes and the bottom of the casing are two pairs of crushing-rolls 14, one pair on each side, the function of which is to crush and kill the insects which drop from the brushes. These rolls are longitudinally disposed along each side of the passage, and inclined guide-plates 15, supported in the casing, feed the insects between the rolls. The shafts of the rollers are journaled in the front and rear walls of the casing and are driven from the shafts of the horizontal brushes by sprockets $9^b$ and $14^a$ and short chains $14^b$.

At the rear of the casing cultivator-beams 16 are pivoted to brackets 17 on the rear wall of the casing, and the beams are provided with any suitable or proper shovels or teeth and also with springs 18 to partly support the weight of the cultivators. These attachments serve to till the ground at the same time as the insect-catching operation, thereby saving time and labor.

The combination of the vertical and horizontal brushes working on both sides of the row of plants effectively cleans the insects therefrom, because the plants are acted on by four brushes sweeping in various directions, and thoroughly rids the plants of the pests.

What we claim as new, and desire to secure by Letters Patent, is—

The combination with a straddle-row casing having a passage therethrough for the plants, of horizontal and vertical rotary brushes on each side of the casing, a horizontal brush on one side being opposite the vertical brush on the other, and insect-killing devices under the brushes.

In testimony whereof we affix our signatures in presence of two witnesses.

CHARLES V. DYER.
    WILLIE S. WILLETTE.

Witnesses:
 L. BURNES,
 J. H. COLLINS.